June 11, 1968 R. C. FISCHER ET AL 3,387,665
AUTOMATIC STEERING APPARATUS FOR IMPLEMENTS
Filed Jan. 22, 1965 3 Sheets-Sheet 1
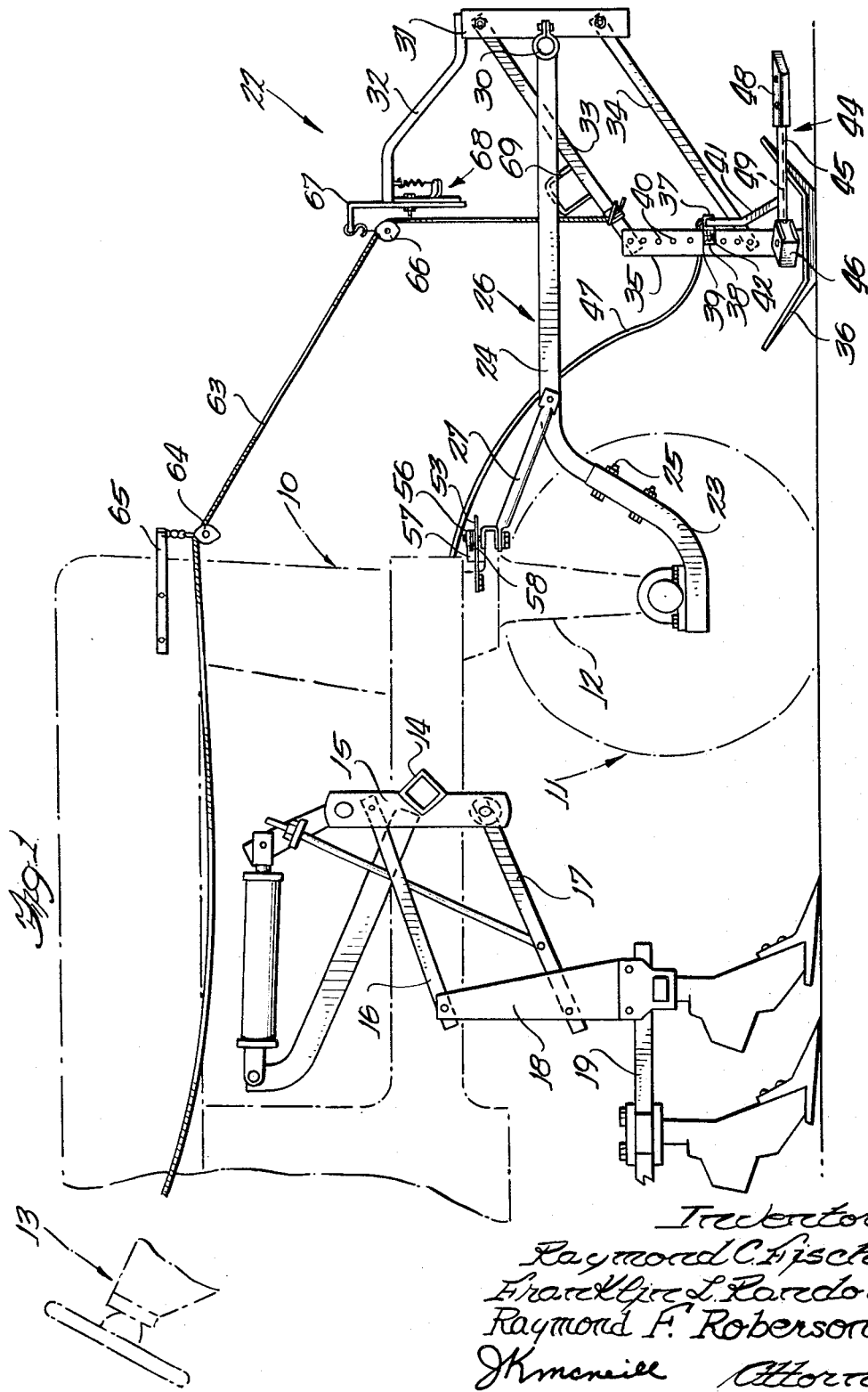
Inventors
Raymond C. Fischer
Franklin L. Randolph
Raymond F. Roberson
JK McNeill  Attorney

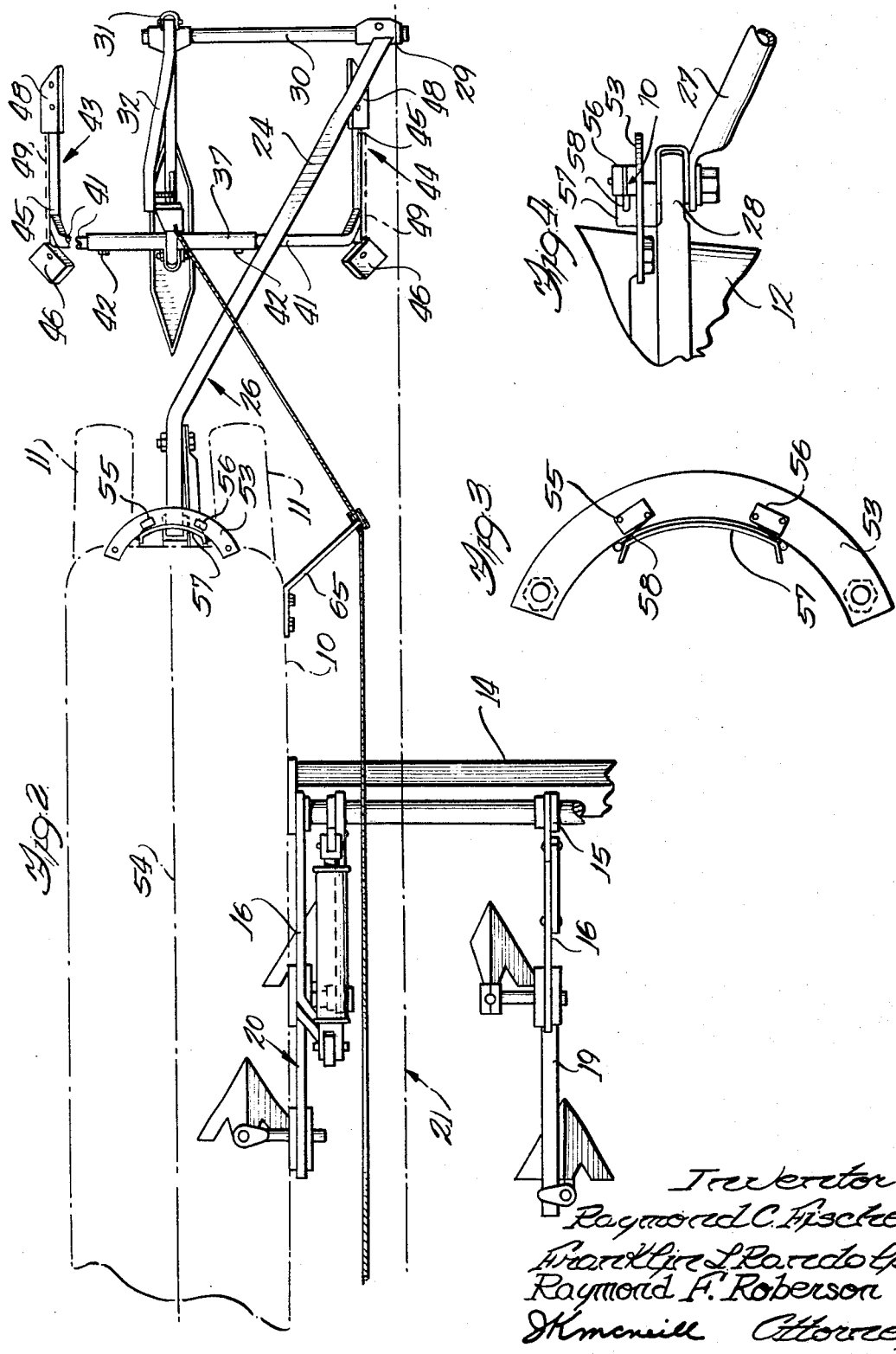

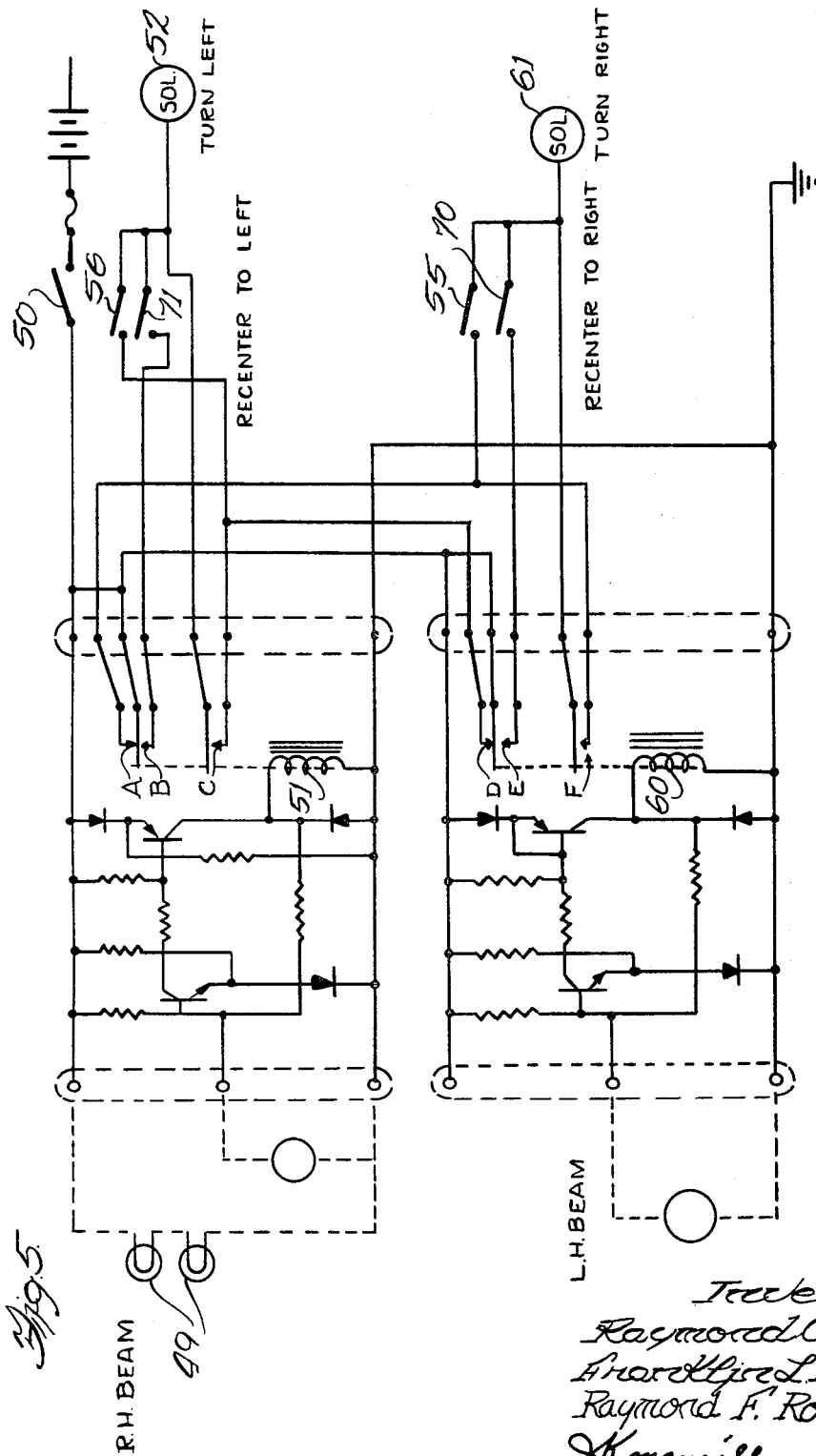

United States Patent Office 3,387,665
Patented June 11, 1968

3,387,665
AUTOMATIC STEERING APPARATUS
FOR IMPLEMENTS
Raymond C. Fischer, Hinsdale, Franklin L. Randolph, Clarendon Hills, and Raymond F. Roberson, Plainfield, Ill., assignors to International Harvester Company, a corporation of Delaware
Filed Jan. 22, 1965, Ser. No. 427,278
10 Claims. (Cl. 172—6)

ABSTRACT OF THE DISCLOSURE

A tractor carrying an earthworking implement and having steerable front wheels provided with sensing means sensitive to veering of the steerable wheels from a selected guide line such as a growing crop. The sensing means is in the form of a photoelectric cell energized by a light beam when the latter intersects a crop row as a result of the steerable wheels turning to one side or the other. Actuation of the cell causes the wheels to return toward a centered position and an auxiliary switch on the steering wheel spindle is actuated by the rotation of the spindle to prevent oversteering.

---

This invention relates to automatic guidance means for implements and vehicles such as farm tractors, and particularly to tractors carrying crop-treating devices.

When operating a tractor mounted implement, such as a cultivator, the earth-working tools are arranged to penetrate the soil adjacent the crop row and the tractor operator must exercise constant vigilance to keep the steerable wheels centered between adjacent rows, because any lateral movement of the tractor results in the cultivator units damaging the growing crop. Therefore, an object of the present invention is the provision of novel guidance means for an implement having a steerable wheel wherein any suitable type of power steering is actuated by sensing means responsive to straying of the steerable wheel in one direction from its centered position to steer the wheel in the other direction toward its normal operating position.

Another object of the invention is the provision of novel electrically operated means utilizing a photoelectric cell, wherein a growing plant interrupts a light beam and actuates a solenoid or the like having a suitable connection to power operated means such as hydraulic or other steering devices by which a mobile crop-treating machine is maintained in its proper relationship to the growing crop.

Another object of the invention is the provision of guidance means of the character referred to wherein the automatic and corrective steering of a wheel by electrical means to guide the wheel away from the growing crop, is supplemented by auxiliary automatically operated means for re-centering the wheel between adjacent crop rows.

Other objects and advantages of the invention will become clear from the following detailed description when read in conjunction with the accompanying drawings, wherein:

FIGURE 1 is a view in side elevation of the front portion of a tractor carrying a cultivator and having mounted thereon guidance means incorporating the features of this invention;

FIGURE 2 is a plan view of a portion of the structure shown in FIGURE 1;

FIGURE 3 is an enlarged plan view of a detail showing a part of the centering mechanism carried by the tractor;

FIGURE 4 is an enlarged detail in side elevation of a portion of the structure shown in FIGURE 1; and FIGURE 5 is an electrical circuit diagram for the guidance or sensing apparatus of this invention.

In the drawings the numeral 10 designates a tractor of the tricycle type having a pair of laterally spaced steerable front wheels 11, closely spaced and supported by a rotatable vertical post or spindle 12 supported from the front end of the tractor and revolved to steer the front wheels by any suitable power operated steering means, not shown, controlled by the tractor operator from a steering mechanism 13.

A portion of a row crop cultivator is shown and comprises a transversely extending tool bar 14 having a bracket 15 secured thereto to which are pivotally connected the forward ends of vertically spaced parallel links 16, 17, the rear ends of which are pivotally connected to a standard 18 supporting a tool gang 19. Tool gang 19 is one of a pair mounted on tool bar 14 at each side of the tractor, another tool gang 20 being provided, and gangs 19 and 20 straddling and adapted to cultivate the ground on each side of a crop row 21.

The tractor wheels 11 are steered by mechanism 13, and any lateral turning of the steerable wheels to either side of the normal position midway between two rows causes the earth-working units 19 and 20 to penetrate and damage the growing crop. Automatic correction of the lateral drift of the tractor wheels to turn them away from the crop row and back to a normal centered position between adjacent rows is made possible by the provision of guidance or sensing apparatus generally indicated by the numeral 22 including a sleeve member 23 affixed to and projecting forwardly from wheel spindle 12 for lateral swinging therewith and slidably receiving one end of a bar 24 secured in the sleeve by bolts 25 and forming with the sleeve a supporting structure in the form of a boom 26 braced by a strap 27 secured to the boom and to the forwardly projecting portion of a flange 28 at the upper end of steering post 12.

As shown in FIGURE 2, bar 24 is bent laterally and is provided at its end with a clamp 29 to which is secured a transversely extending tubular member 30. The inner end of pipe 30 extends substantially to the centerline of the tractor and has affixed thereto a vertically extending bracket 31 to the upper end of which is affixed a rearwardly extending bar 32. A pair of vertically spaced parallel links 33 and 34 are pivotally connected to bracket 31 and their rear ends are pivotally connected to a standard 35 having secured to its lower end a ground-engaging shoe 36.

A transversely extending tubular member 37 is adjustably secured by a clamp 38 to standard 35, a bolt 39 carried by the clamp being optionaly receivable in one of a number of openings 40 provided in the standard. A pair of bars 41 are slidably received in the ends of member 37 and adjustably held in place by set screws 42.

The outer ends of bars 41 are bent downwardly and support left and right-hand sensing devices 43 and 44, respectively. The devices 43 and 44 travel alongside adjacent crop rows and are substantial duplicates, each comprising a generally horizontal longitudinally extending rod-like member 45 affixed to the lower end of bar 41 and having secured to its rear end a box-like member 46 housing an electric light bulb and socket of any well known form, not shown, receiving electric current through a wire 47 connected to a source of electric current, also of any conventional form carried by the tractor and also not shown.

A photoelectric cell of any well known form is provided in a housing 48 in the path of a light beam 49 from the bulb and housing 46. Should the tractor wheels 11 turn laterally and cause the right-hand sensing unit 44 to stray into the crop row 21, the crop serves as a guide line operatively engageable with the sensing unit, and a growing plant will interrupt the beam 49 and reduce current flow in the associated photoelectric, increasing flow through the amplifier circuit.

FIGURE 5 is an electric circuit diagram illustrating the manner in which the sensing apparatus of this invention is utilized to actuate the steering mechanism 13 of the tractor. When the tractor with the cultivating units and the sensing apparatus is operated, the main switch 50 is closed. If we assume that the tractor has drifted to the right, and right-hand sensing unit 44 has engaged the crop, the right-hand beam 49 is interrupted. Accompanying reduced current flow through the photoelectric cell increases current through the amplifier to actuate a relay 51, which opens a contact A and closes contacts B and C. This permits battery current to flow through closed contacts D and C to solenoid 52 controlling the steering mechanism 13 to cause it to turn the tractor wheels 11 to the left. The blocked right hand beam 49 is thus turned away from the crop row.

Auxiliary means is provided for automatically recentering the tractor wheels 11 after the beam 49 has been unblocked. A sector 52 is secured to the tractor body to remain stationary therewith and has secured thereto on opposite sides of the centerline 54 of the tractor, a pair of left and right-hand electrical switches 55 and 56, respectively, of any suitable construction. An actuating member in the form of a cam 57 carried by the flange portion 28 of the wheel spindle 12 engages a switch-actuating lever 58 carrying a roller at its end for the right-hand switch 56 and closes the latter. Until right-hand beam 49 moves away from the growing crop and becomes unblocked, current cannot flow through switch 55 so long as contact A is open. When the beam is no longer blocked, relay 51 is de-activated, returning the contacts to the normal condition indicated. Now current is able to flow through contacts A and switch 55 to actuate the solenoid controlling a right turn. This will cause the tractor wheels to rotate until they are centered, at which time switch 55 is automatically opened and movement stops.

Similarly, if the left-hand beam 49 is interrupted, relay 60 opens contact point D and closes points E and F. Current is now able to flow from the battery through contacts A and F to actuate the right turn solenoid 61. The right turn causes switch 56 to be closed, and after the left-hand beam 49 is unblocked, current flows through contacts D and 56 to recenter the front wheels.

It may be understood that the particular for of steering mechanism employed forms no part of this invention, the invention being equally applicable to conventional hydraulic steering means and currently popular hydrostatic devices and the like. It may be further noted, however, that the sensing apparatus 44 is adapted to float and to rise and fall with the contour of the ground in a generally straight line by virtue of the suspension thereof by the parallel links 33 and 34. Sensing apparatus 44 may be de-activated and moved to a non-operating position manually by the provision of a cable 63 extending from a location convenient to the tractor operator through a pulley 64 mounted on a bracket 65 secured to the tractor and through another pulley 66 suspended from the bracket 67 secured to the rear end of bar 32, the lower end of the cable being fastened to upper link 33. Suitable means for securing the cable 63 to the tractor may be provided to hold the sensing unit in its raised position, or a latching mechanism indicated at 68, the details of construction of which form no part of this invention, may be utilized in association with the bracket 67 and bar 32 to engage a latch member 69 secured to upper link 33 to maintain the sensing apparatus in a transport position.

It sometimes happens that both right and left-hand beams are blocked at the same time. This may occur when the tractor steering has been corrected, for example, to cause a left turn. If the left-hand beam clears, current flows through contact E to a switch 70 to actuate the right turn solenoid. If the right-hand beam becomes blocked before the left-hand beam clears, current flows through contact B to a switch 71 to actuate the left turn solenoid.

It is believed that the construction and operation of the sensing and guidance apparatus of this invention will be clearly understood from the foregoing description. It should likewise be understood that the invention has been described in its preferred embodiment and that modifications may be made therein without departing from the spirit of the invention or the scope of the appended claims.

What is claimed is:

1. In a row crop treating implement including a tractor having crop treating devices thereon and a steerable front wheel arranged to travel in a normal centered position between adjacent rows, said wheel being mounted on the tractor for swinging about a vertical axis to steer the tractor and including vertical spindle means supporting the wheel and rotatable therewith, sensing means mounted on said spindle means laterally swingable with said wheel and including a light source and a photoelectric cell, an electrical circuit associated with said sensing member having means transmitting current from said current source to said light source to provide a beam directed at and energizing said cell, said beam being in a position to intersect the growing crop and to be interrupted thereby upon lateral turning of the wheel in the direction of a crop row, and said circuit including actuating means operatively connecting said cell to said steering mechanism to actuate the latter to turn the wheel in the other direction away from the crop row.

2. The invention set forth in claim 1, wherein said sensing means includes a supporting member secured to and extending forwardly from said spindle means for lateral swinging upon turning of said wheel in one direction, said supporting member carrying a ground-engaging member disposed alongside a crop row and upon which is mounted said light source and said photoelectric cell.

3. The invention set forth in claim 2, wherein said ground-engaging member is mounted on said supporting member for vertical floating movement relative thereto and carries a crosspiece on each end of which is mounted a light source and a photoelectric cell to provide light beams disposed alongside adjacent crop rows.

4. The invention set forth in claim 3, wherein said ground-engaging member is mounted on said supporting member by generally parallel links to accommodate floating movement of the ground-engaging member and the crosspiece carrying said light sources and cells, lift means being provided between said supporting member and one of said links for raising the ground-engaging member to a non-operating position.

5. The invention set forth in claim 4, wherein latch means is provided on said supporting member cooperative with latch means on one of said links for holding the ground-engaging member in said non-operating position.

6. In a row crop treating implement including a tractor having crop treating devices thereon and a steerable front wheel arranged to travel in a normal centered position between adjacent rows, said wheel being mounted on the tractor for swinging about a vertical axis to steer the tractor and including vertical spindle means supporting the wheel and rotatable therewith, sensing means mounted on said spindle means laterally swingable with said wheel and including a light source and a photoelectric cell, an electrical circuit associated with said sensing member having means transmitting current from said current source to said light source to provide a beam directed at and energizing said cell, said beam being in a position to intersect the growing crop and to be interrupted thereby, upon lateral turning of the wheel in the direction of a crop row, and said circuit including actuating means operatively connecting said cell to said steering mechanism to actuate the latter to turn the wheel in the other direction away from the crop row, and auxiliary actuating means for said steering mechanism including cooperating elements mounted on the tractor and on said spindle means and operable, after a predetermined rotation of said spindle means in said other direction to turn said wheel carrying spindle in said one direction.

7. The invention set forth in claim 6, wherein said normal centered position of said wheel is represented by a line between and parallel to adjacent crop rows, and said auxiliary actuating means comprises a pair of electric switches mounted on the tractor body on opposite sides of said line and cam means carried by said spindle means and engageable with said switches to operate said steering mechanism and rotate said spindle means in a direction to return said wheel to its centered position.

8. In a mobile crop treating implement having thereon a source of electric current and steering mechanism for guiding the implement in the growing crop, a wheel-carrying spindle mounted on the implement for rotation about a vertical axis to steer the implement, said spindle being rotatable to laterally swing the wheel to opposite sides of a centered position, sensing means mounted on the implement responsive to rotation of the wheel spindle in one direction for automatically turning the wheel in the other direction, including a light source and a photoelectric cell, an electrical circuit associated with said sensing member having means transmitting current from said current source to said light source to provide a beam directed at and energizing said cell, said beam being interruptable by engagement with the growing crop and said circuit including means operatively connecting said cell to said steering mechanism to turn the wheel in said other direction, and centering means in the mounting of said spindle on the implement operative after a predetermined rotation of said spindle to actuate said steering mechanism to return said wheel to its centered position, said sensing means comprising a forwardly extending boom secured to said wheel spindle and laterally swingable therewith, and said boom carrying said light source and said photoelectric cell.

9. The invention set forth in claim 8, wherein said implement is a row crop cultivator and a pair of laterally spaced ground-engaging shoes are mounted on the boom alongside adjacent crop rows, each of said shoes carrying one said light source and one said photoelectric cell.

10. In an agricultural implement including a tractor for propelling earthworking tools having rotatable spindle means an a steering front wheel mounted on the spindle means arranged to travel in a normal centered position with respect to a predetermined guide line, said tractor having power steering means for steering said wheel, sensing means on the tractor disposed in operative relation to said guide line and movable relative to the tractor in response to the turning of said wheel in one direction relative to said guide line, an electrical circuit associated with said sensing means and including actuating means operatively connecting said sensing means to said power steering mechanism and effective upon turning the wheel in one direction to actuate the power steering mechanism to turn the wheel in the other direction, and auxiliary actuating means for said steering mechanism including cooperating elements mounted on the tractor and on said spindle means and operable, after a predetermined rotating of said spindle means in said other direction to turn said spindle means in said one direction.

References Cited
UNITED STATES PATENTS

| | | | |
|---|---|---|---|
| 1,281,428 | 10/1918 | Stout | 180—79.1 |
| 2,981,355 | 4/1961 | Rabuse | 172—5 X |
| 3,038,544 | 6/1962 | Richey et al. | 172—5 |
| 3,208,535 | 9/1965 | Fischer et al. | 172—6 |

ANTONIO F. GUIDA, *Primary Examiner.*

ABRAHAM G. STONE, *Examiner.*

J. R. OAKS, *Assistant Examiner.*